(12) United States Patent
Cheng et al.

(10) Patent No.: US 8,966,615 B2
(45) Date of Patent: Feb. 24, 2015

(54) SECURITY DEVICE AND DISPLAY METHOD THEREOF

(75) Inventors: Ping Cheng, Beijing (CN); Xiao Yang, Beijing (CN); Jia Yu, Beijing (CN); Linlin Gong, Beijing (CN); Jian Wang, Beijing (CN)

(73) Assignee: Netqin Mobile (Beijing) Co., Ltd., Beijing (CN)

( * ) Notice: Subject to any disclaimer, the term of this patent is extended or adjusted under 35 U.S.C. 154(b) by 58 days.

(21) Appl. No.: 13/527,023

(22) Filed: Jun. 19, 2012

(65) Prior Publication Data

US 2013/0291095 A1    Oct. 31, 2013

(30) Foreign Application Priority Data

Apr. 27, 2012  (CN) .......................... 2012 1 0127980

(51) Int. Cl.
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |

(52) U.S. Cl.
USPC ........................................................... 726/19

(58) Field of Classification Search
CPC ...................................................... B60R 25/305
USPC ............................................................ 726/19
See application file for complete search history.

(56) References Cited

U.S. PATENT DOCUMENTS

| 6,314,425 B1 * | 11/2001 | Serbinis et al. ........................ 1/1 |
| 2006/0206429 A1 * | 9/2006 | Martinez .......................... 705/50 |
| 2012/0093374 A1 * | 4/2012 | Fan et al. ....................... 382/116 |

* cited by examiner

*Primary Examiner* — Dant Shaifer Harriman
(74) *Attorney, Agent, or Firm* — Scully, Scott, Murphy & Presser, P.C.

(57) ABSTRACT

A display method that is used for a security device installed with a camera module and a display module includes A. when the security device captured a preset image by the camera module, the security device displaying an interface for entering a password by the display module, and B. when the password is successfully matched, the security device displaying a predetermined object by the display module. By hiding the interface for entering a password, the invention improves the security capability of the device and meets the requirement of information security at present.

18 Claims, 5 Drawing Sheets

SECURITY DEVICE AND DISPLAY METHOD THEREOF

FIELD OF THE INVENTION

The invention relates a security device and a display method thereof.

BACKGROUND OF THE INVENTION

With development of information technology, information security becomes more and more important. However, information security in the prior art still need to be protected by relying on conventional methods such as encrypting by using a cipher code or a pattern, which can not meet the requirement of the current information security.

SUMMARY OF THE INVENTION

In view of the above, the purpose of the invention is to provide a security device and a display solution thereof, so as to improve encryption in the prior art and meet the requirement of the current information security.

Therefore, the invention provides a display method for a security device installed with a camera module and a display module. The method comprises
A. when the security device capturing a preset image by the camera module, the security device displays an interface for entering a password by the display module;
B. when the password is matched, the security device displaying a predetermined object by the display module.

According to the above method, the preset image comprises any one of predetermined color, brightness, pattern, or any combination thereof.

According to the above method, the password comprises any one of text, pattern, or combination thereof.

According to the above method, the predetermined object comprises any one of text, picture, video, program, interface, or any combination thereof.

According to the above method, the method further comprises
C. when the password is unmatched, the security device recording times of failure and when the times exceed a preset value, the security device recording current information.

According to the above method, the method further comprises sending, by the security device, the current information to a predetermined address via a predetermined way.

According to the above method, the predetermined way comprises any one of phone call, voice mail, short message, multimedia message, mail, instant messaging tool and social network, or any combination thereof.

According to the above method, the current information includes any one of time, location, background, or any combination thereof.

The invention further provides a security device, which comprises a camera module and a display module, wherein the security device further comprises
a confirming module, configured to confirm whether an image captured by the camera module is a preset image; and for making the display module display an interface for entering a password if the image is confirmed to be the preset image; and
a determining module, configured to determine whether an entered password is matched, and to make the display module display a predetermined object if the entered password is determined to be matched.

According to the above security device, the preset image comprises any one of predetermined color, brightness, pattern, or any combination thereof.

According to the above security device, the password comprises any one of text, pattern, or combination thereof.

According to the above security device, the predetermined object comprises any one of text, picture, video, program, interface, or any combination thereof.

According to the above security device, the security device further comprises
a recording module, configured to record times of failure when the password is unmatched and record current information of the security device when the failure times exceed a preset value.

According to the above security device, the security device further comprises
a sending module, configured to send the current information to a predetermined address via a predetermined way.

According to the above security device, the predetermined way comprises any one of phone call, voice mail, short message, multimedia message, mail, instant messaging tool and social network, or any combination thereof.

According to the above security device, the current information includes any one of time, location, background, or any combination thereof.

In a word, by hiding the interface for entering a password, the invention improves the security capability of a device and meets the requirement of current information security.

BRIEF DESCRIPTION OF THE DRAWINGS

For better understanding and clarity of the embodiments of the invention or the technical solutions in the prior art, simple introduction is given in cooperate with accompanying drawings which are required for the illustration of embodiments or the prior art. It is obvious that the description of the accompanying drawings only described some embodiments of the invention and those skilled in the art can obtain other accompanying drawings according to the accompanying drawings without creative labor. In the accompanying drawings.

DETAILED DESCRIPTION OF THE INVENTION

Objects, technical solutions, and advantages of the invention will be easily understood by reference to the following description of embodiments when read in conjunction with the accompanying drawings. Hereby, the exemplary embodiments of the invention together with the description serve to explain, but not limit, the principles of the invention.

Figure 1:
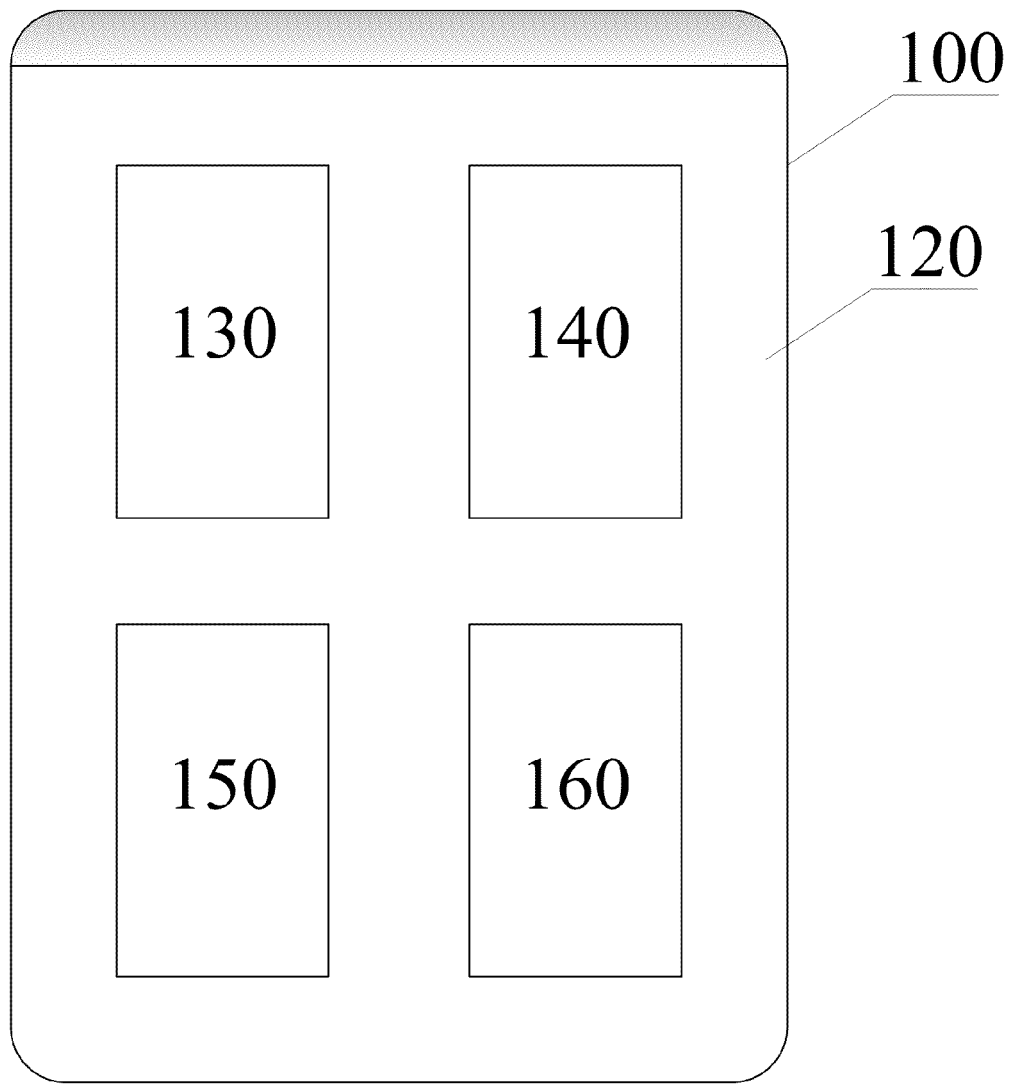
FIG. 1 is a schematic diagram of display of the display module of the security device according to one embodiment of the present invention.

FIG. 1 is a schematic diagram of an interface of a security device according to one embodiment of the present invention. A security device 100 includes a camera module 110 (which is not shown) such as a camera and a display module 120 such as a display screen; and the security device 100 can be any device, which includes but not limited to a cell phone, a tablet computer, a desktop computer, a laptop computer, etc. A plurality of icons are displayed on the display module 120, shown as 130,140,150 and 160 etc. Those icons represent objects which include but not limited to image, video, program, interface, etc.

For example, the object represented by icon 130 is program. When a user clicks icon 130 by a mouse, a keyboard, a touch screen, and so on, the flowing process of the method according to the embodiment of the invention is as the following:

Step S10, displaying a image, which is capturing by the camera module 110, on the display module 120; the camera module can be in photo mode or video mode;

Step S20, when the camera module 110 captures a preset image, the display module 120 displaying an interface for entering a password. Hereby, the preset image includes any one of color, brightness, pattern or any combination thereof which satisfy a predetermined condition. The embodiments of using color, brightness and pattern respectively are as the following.

1. An Embodiment of Using Color

The user presets a color value as base color and the user sets positive and negative tolerance simultaneously; a color represented by a color value which is in the range of positive and negative tolerance is trigger color. When the camera module 110 capturing an image, the camera module 110 divides the image into units of n×n pixels (number of pixels can be equal to the resolution of the camera module 110 or less than the pixels thereof; In case that the number of pixels is less than the resolution, the color value of each unit is equal to average value of color values of all actual pixels in the unit), if the proportion for the number of pixel units of which color values are in the range of tolerance in total number of all pixel units exceeds a preset value (for example, including but not limited to, 80%, which can be set according to actual situation), it is regarded as satisfying trigger color, i.e. the preset image is captured.

2. An Embodiment of Using Brightness

The user presets a brightness value as base brightness and the user sets positive and negative tolerance simultaneously; an brightness represented by a brightness value which in the range of positive and negative tolerance is preset color. When the camera module 110 capturing an image, the camera module 110 divides the image into units of n×n pixels (number of pixels can be equal to resolution of the camera module 110 or less than the pixels thereof; in case that the number of pixels is less than the resolution, the brightness value of each unit is equal to average value of brightness values of all actual pixels in the unit), if the proportion for the number of pixel units of which brightness values are in the range of tolerance in total number of all pixel units exceeds a preset value (for example, including but not limited to, 80%, which can be set according to actual situation), it is regarded as satisfying trigger brightness, i.e. the preset image is captured.

3. An Embodiment of Using Pattern

The user draws an outline as trigger pattern, the outline can be unclosed. When the camera module 110 capturing an image, the camera module 110 will detect the object in the image (if required, including that, but not limited to, detection is made in situations of different focuses; the detection can determine the edge line of the object according to color contrast value) so as to compare the detected edge line of the object with the trigger pattern, if they are matched, the trigger pattern is satisfied, i.e. the preset image is captured.

Of course, the above three embodiments serve to exemplary illustration; any method for identifying color, brightness, pattern of an image is adaptable.

Figure 2:
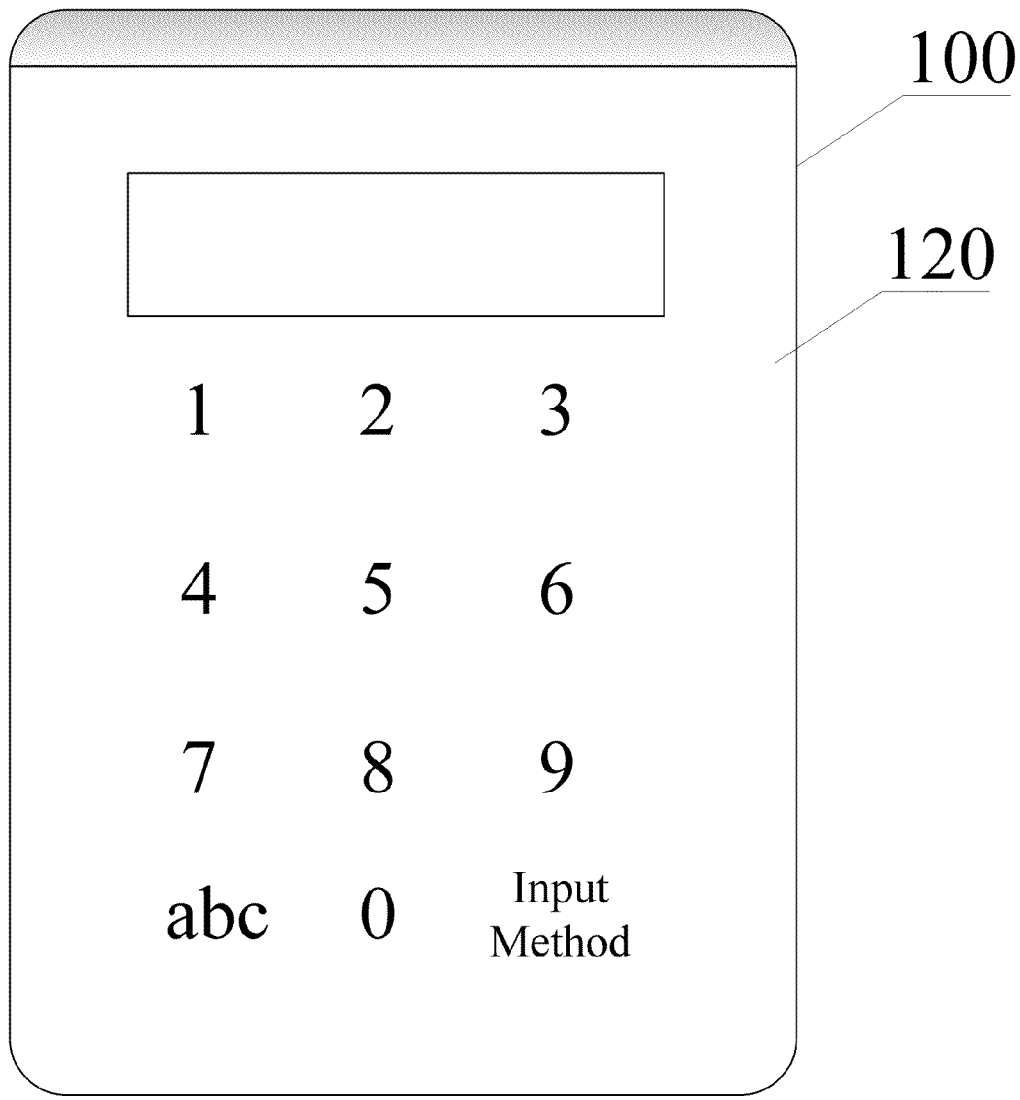
FIG. 2 is an interface for entering text password displayed on the display module of the security device according to one embodiment of the present invention.
Figure 3:
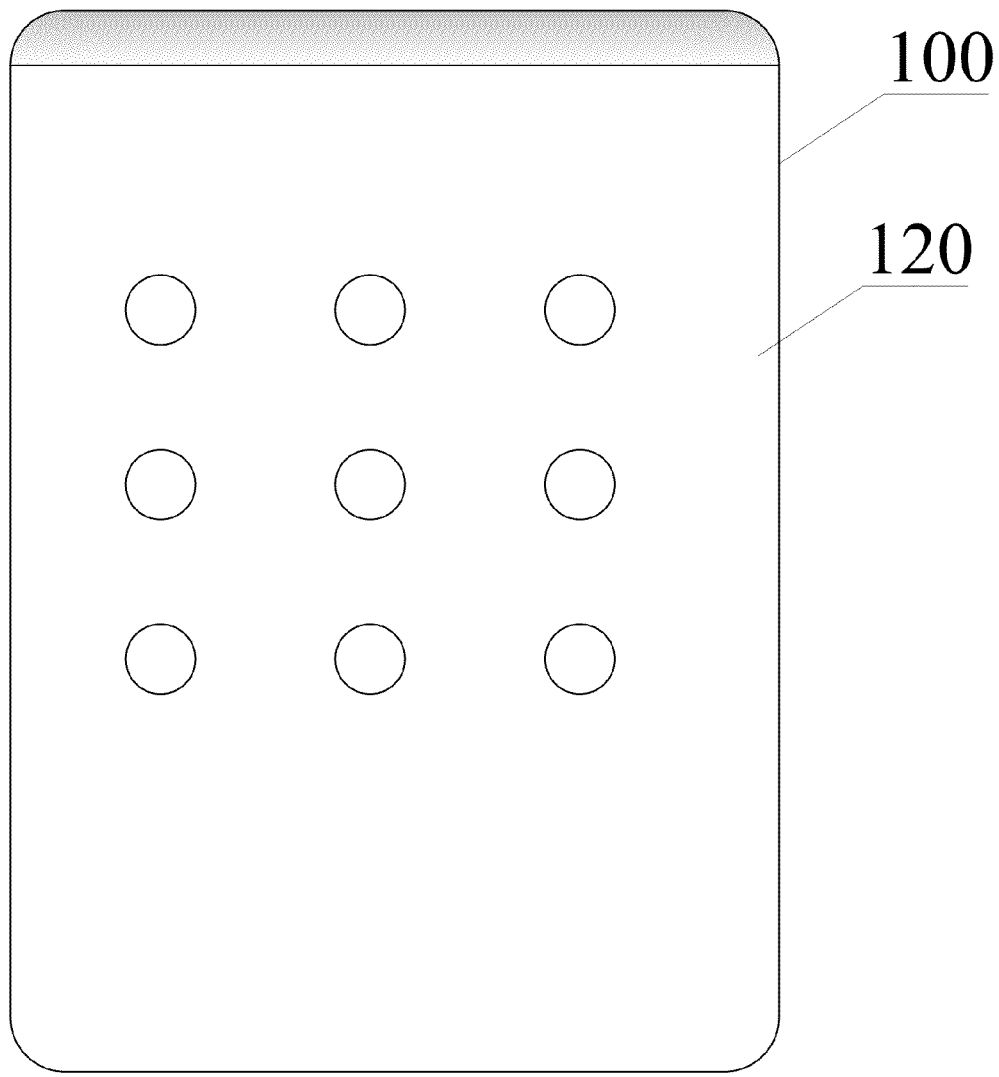
FIG. 3 is an interface for entering pattern password displayed on the display module of the security device according to one embodiment of the present invention.
Figure 4:
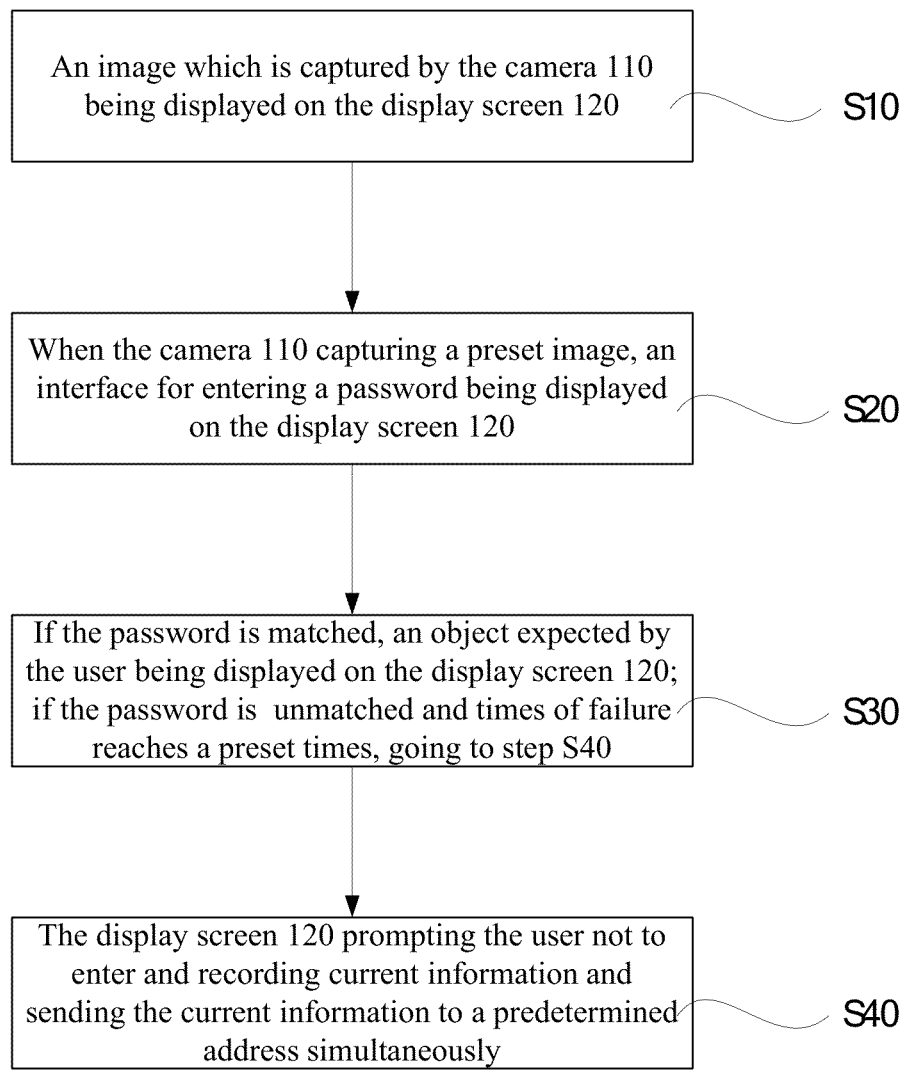
FIG. 4 is a flow chart of the display method according to one embodiment of the present invention.

In addition, a set password can be text or pattern; the password entering interface is shown by FIG. 2 and FIG. 3; FIG. 2 is a text entering interface; FIG. 3 is a pattern entering interface; the pattern can be made up by connecting dots; of course, it can be a combination of text and pattern. It should be understood that the method for above password setting and entering is just for example only. Any applicable method for password setting and entering can be used.

Step S30, if the password is matched, an object expected by the user, i.e. program, being displayed on the display module 120; if the password is not matched, the user can keep on trying for a predetermined failure times (such as 10 times), if reach the predetermined failure times, go to step S40;

Step S40, the display module 120 prompting the user that the user can not do the entering operation and recording current information simultaneously; the current information includes but not limited to time, location (for example, obtained by a GPS device), background (for example, obtained by camera module 110) etc, for example, Monday, Apr. 16, 2012, 39° 54' N116° 23' E; at same time, the current information is sent to a predetermined address in a predetermined way; the predetermined way includes, but not limited to any one of phone call, voice mail, short message, e-message, mail, instant messaging tool, social network or any combination thereof. The predetermined address can be preset by the user, or the predetermined address is selected from a place such as phone book, etc. Of course, an alert can be given by other ways in the prior art.

Figure 5:
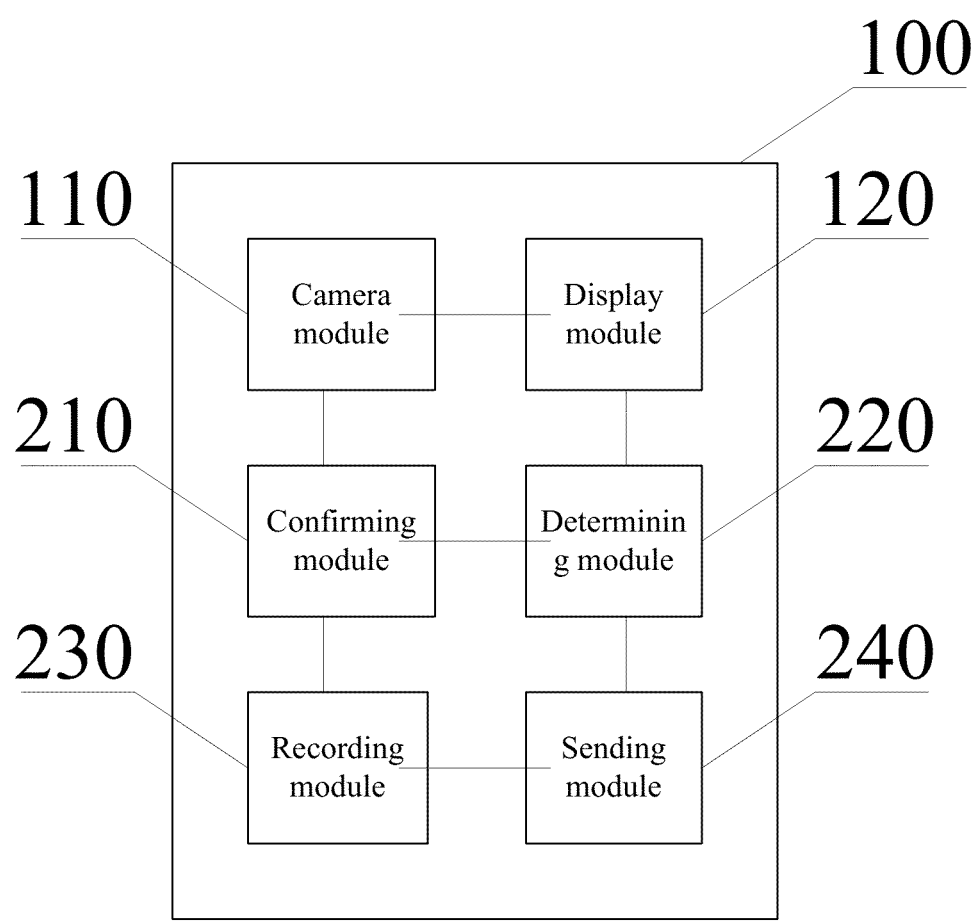
FIG. 5 is a block diagram of the security device according to one embodiment of the present invention.

As shown in FIG. 5, the invention further provides a security device 100, which includes a camera module 110, a display module 120, a confirming module 210, a determining module 220, a recording module 230 and a sending module 240.

The camera module 110 is capable of capturing an image, which includes but not limited to a camera, and is for capturing image by photo mode or video mode.

The display module 120 is capable of displaying icon, image, program, interface, and so on, which includes but not limited to a display screen, a touch screen, etc.

The confirming module 210 is configured to make the display module 120 present an interface for entering a password when confirming that a preset image is captured by the camera module 110. Hereby, the preset image comprises any one of color, brightness, pattern or any combination thereof which satisfy a predetermined condition. The embodiments of using color, brightness and pattern respectively are as the following.

1. An Embodiment of Using Color

The user presets a color value as base color and the user sets positive and negative tolerance simultaneously; a color represented by a color value which is in the range of positive and negative tolerance is trigger color. When the camera module 110 capturing an image, the camera module 110 divides the image into units of n×n pixels (number of pixels can be equal to the resolution of the camera module 110 or less than the pixels thereof; In case that the number of pixels is less than the resolution, the color value of each unit is equal to average value of color values of all actual pixels in the unit), if the proportion for the number of pixel units of which color values are in the range of tolerance in total number of all pixel units exceeds a preset value (for example, including but not limited to, 80%, which can be set according to actual situation), it is regarded as satisfying trigger color, i.e. the preset image is captured.

2. An Embodiment of Using Brightness

The user presets a brightness value as base brightness and the user sets positive and negative tolerance simultaneously; an brightness represented by a brightness value which in the range of positive and negative tolerance is preset color. When the camera module 110 capturing an image, the camera module 110 divides the image into units of n×n pixels (number of pixels can be equal to resolution of the camera module 110 or less than the pixels thereof; in case that the number of pixels is less than the resolution, the brightness value of each unit is equal to average value of brightness values of all actual pixels in the unit), if the proportion for the number of pixel units of which brightness values are in the range of tolerance in total number of all pixel units exceeds a preset value (for example, including but not limited to, 80%, which can be set according to actual situation), it is regarded as satisfying trigger brightness, i.e. the preset image is captured.

3. An Embodiment of Using Pattern

The user draws an outline as trigger pattern, the outline can be unclosed. When the camera module 110 capturing an image, the camera module 110 will detect the object in the image (if required, including that, but not limited to, detection is made in situations of different focuses; the detection can determine the edge line of the object according to color contrast value) so as to compare the detected edge line of the object with the trigger pattern, if they are matched, the trigger pattern is satisfied, i.e. the preset image is captured.

Of course, the above three embodiments serve to exemplary illustration; any method for identifying color, brightness and pattern is adaptable.

In addition, a set password can be text or pattern; the password entering interface is shown by FIG. 2 and FIG. 3; FIG. 2 is a text entering interface; FIG. 3 is a pattern entering interface; the pattern can be made up by connecting dots; of course, it can be a combination of text and pattern. It should be understood that the method for password setting and entering is just for example only. Any applicable method for setting and entering a password can be used.

The determining module 220 is configured to determine whether the password entered by the user is matched, if the password is matched, an object expected by the user is displayed on the display module 120; if the password is unmatched, the user can keep on trying for a predetermined failure times (such as 10 times), if the times reaches the predetermined failure times, the display module 120 displays information and prompts the user that the user can not do the entering operation and the recording module 230 records current information simultaneously; the current information includes but not limited to time, location (for example, obtained by a GPS device), background (for example, obtained by camera module 110) etc; for example, Monday, Apr. 16, 2012, 39° 54' N116° 23' E; Simultaneously, the sending module 240 sends current information to a predetermined address in a predetermined way; the predetermined way includes but not limited to any one of phone call, voice mail, short message, e-message, mail, instant messaging tool, social network or any combination thereof. The predetermined address can be preset by the user, or the predetermined address is selected from phone book, etc. Of course, an alert can be given in other ways of the prior art.

The above detailed description of the detailed embodiments has been presented for the purpose, technical solutions and advantages of the invention better in details. It should be understood that, all of the above description serves for the preset embodiments of the invention only and has no limitation of the scope of the invention. The present invention covers any and all modifications, equivalent alternatives and improvements, and so on, that fall in the spirit and principle of the invention.

What is claimed is:

1. A display method for a security device installed with a camera module and a display module, comprising:
   A. when an image captured by the camera module of the security device satisfies a preset trigger condition, the security device displaying using the display module an interface for entering a password;
   B. when the password is matched, the security device displaying using the display module a predetermined object,
   wherein the preset trigger condition comprises any one of a trigger color, a trigger brightness, a trigger pattern, or any combination thereof,
   wherein when the preset trigger condition comprises a trigger brightness, the trigger brightness comprises a base brightness and a tolerance with respect to the base brightness, and A further comprises:
   dividing the image captured by the camera module into a number of pixel units, and
   determining that the preset trigger condition is satisfied, when a proportion of the number of pixel units, of which brightness values are in the range of the tolerance, with respect to the total number of all pixel units exceeds a preset value.

2. The method of claim 1, wherein the password comprises any one of text, pattern, or combination thereof.

3. The method of claim 1, wherein the predetermined object comprises any one of text, picture, video, program, interface, or any combination thereof.

4. The method of claim 1, further comprising
   C. when the password is unmatched, the security device recording times of failure and when the times exceed a preset value, the security device recording current information.

5. The method of claim 4, further comprising sending, by the security device, the current information to a predetermined address via a predetermined way.

6. The method of claim 5, wherein the predetermined way comprises any one of phone call, voice mail, short message, multimedia message, mail, instant messaging tool and, social network, or any combination thereof.

7. The method of claim 4, wherein the current information includes any one of time, location, background, or any combination thereof.

8. The method of claim 1, wherein when the preset trigger condition comprises a trigger color, the trigger color comprises a base color and a tolerance with respect to the base color, and A further comprises:
   dividing the image captured by the camera module into a number of pixel units, and
   determining that the preset trigger condition is satisfied, when a proportion of the number of pixel units, of which color values are in the range of the tolerance, with respect to the total number of all pixel units exceeds a preset value.

9. The method of claim 1, wherein when the preset trigger condition comprises a trigger pattern, A further comprises:
   detecting an edge line of an object in the image, and
   determining that the preset trigger condition is satisfied, when the detected edge line of the object matches a preset outline.

10. A security device, comprising a camera module and a display module, wherein the security device further comprising:

a confirming module, configured to confirm whether an image captured by the camera module satisfies a preset trigger condition; and to make the display module display an interface for entering a password if it is confirmed the image satisfies the preset trigger condition; and a determining module, configured to determine whether an entered password is matched, and to make the display module display a predetermined object if the entered password is determined to be matched, wherein the preset trigger condition comprises any one of a trigger color, a trigger brightness, a trigger pattern, or any combination thereof, wherein when the preset trigger condition comprises a trigger brightness, the trigger brightness comprises a base brightness and a tolerance with respect to the base brightness, and the confirming module is further configured to:

divide the image into a number of pixel units, and determine that the preset trigger condition is satisfied, when a proportion of the number of pixel units, of which brightness values are in the range of the tolerance, with respect to the total number of all pixel units exceeds a preset value.

11. The security device of claim 10, wherein the password comprises any one of text, pattern, or combination thereof.

12. The security device of claim 10, wherein the predetermined object comprises any one of text, picture, video, program, interface, or any combination thereof.

13. The security device of claim 10, further comprising a recording module, configured to record times of failure when the password is unmatched and record current information of the security device when the failure times exceed a preset value.

14. The security device of claim 13, further comprising a sending module configured to send the current information to a predetermined address in a predetermined way.

15. The security device of claim 14, wherein the predetermined way comprises any one of phone call, voice mail, short message, multimedia message, mail, instant messaging tool, social network, or any combination thereof.

16. The security device of claim 13, wherein the current information includes any one of time, location, background, or any combination thereof.

17. The security device of claim 10, wherein when the preset trigger condition comprises a trigger color, the trigger color comprises a base color and a tolerance with respect to the base color, and the confirming module is further configured to:

divide the image captured by the camera module into a number of pixel units, and determine that the preset trigger condition is satisfied, when a proportion of the number of pixel units, of which color values are in the range of the tolerance, with respect to the total number of all pixel units exceeds a preset value.

18. The security device of claim 10, wherein when the preset trigger condition comprises a trigger pattern, the confirming module is further configured to:

detect an edge line of an object in the image, and determine that the preset trigger condition is satisfied, when the detected edge line of the object matches a preset outline.

\* \* \* \* \*